United States Patent [19]

Sidebotham et al.

[11] 4,064,079

[45] Dec. 20, 1977

[54] POLYESTER POLYMER RECOVERY

[75] Inventors: Norman C. Sidebotham, Gulf Breeze; Paul D. Shoemaker; Clarence W. Young, III, both of Pensacola, all of Fla.

[73] Assignee: Monsanto Company, Decatur, Ala.

[21] Appl. No.: 674,023

[22] Filed: Apr. 5, 1976

Related U.S. Application Data

[63] Continuation-in-part of Ser. No. 571,455, April 25, 1975, abandoned.

[51] Int. Cl.$^2$ .................. C08J 11/04; C08G 63/70
[52] U.S. Cl. .................. 260/2.3; 260/33.2 R; 260/33.6 R; 260/32.8 R; 260/33.8 R; 260/75 T; 264/37
[58] Field of Search ............... 260/2.3, 75 T, 33.6 R; 264/37

[56] References Cited

U.S. PATENT DOCUMENTS

| | | | |
|---|---|---|---|
| 2,742,440 | 4/1956 | Stott et al. | 260/2.3 |
| 2,762,788 | 9/1956 | Siggel et al. | 260/75 T |
| 2,945,840 | 7/1960 | Roberts et al. | 260/75 T |
| 3,696,058 | 10/1972 | Teti | 260/2.3 |
| 3,935,169 | 1/1976 | Reen | 260/75 T |

FOREIGN PATENT DOCUMENTS

608,656  11/1960  Canada.

OTHER PUBLICATIONS

Korshak et al., *Polyesters*, Pergamon Press, Oxford (1965) pp. 298, 299.

*Primary Examiner*—Howard E. Schain
*Assistant Examiner*—W. C. Danison, Jr.
*Attorney, Agent, or Firm*—Robert L. Broad, Jr.

[57] ABSTRACT

Polyester fibers are dissolved and solid linear polyester polymer recovered for use in the production of new linear polyester products, particularly polyester fibers or filaments, by the process of dissolving the fibers in a non-depolymerizing dissolution solvent for polyester characterized by inclusion of carbocyclic rings in its structural formula under dissolution conditions for polyester polymer; thereafter quenching the polyester solution; and separating the solid polyester from the solution.

22 Claims, 1 Drawing Figure

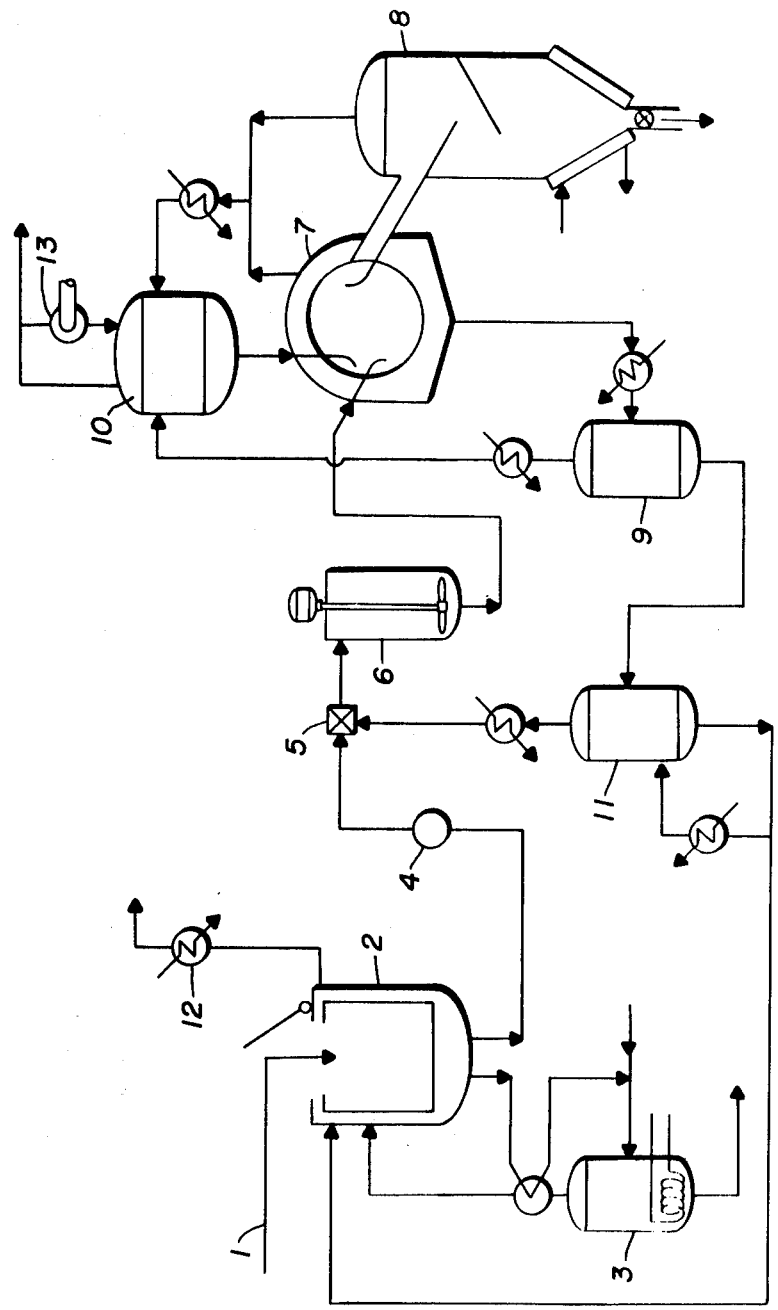

POLYESTER POLYMER RECOVERY

BACKGROUND OF THE INVENTION

1. Field of the Invention

The invention relates to a process for recovering linear thermoplastic polymers, particularly polyester polymers, from polyester fibers, including collections of polyester yarns, films, fibers or fabrics, for use in production of new polyester fibers, films or other products. More specifically, the invention relates to a process for recovering linear polyester polymer by means of dissolving the fibers; thereafter quenching the polyester solution, thereby to precipitate out and recover the linear polyester polymer for reuse.

2. Prior Art

Various methods have been described in the prior art for the recovery of thermoplastic polymer, including polyester polymers, from scrap polymer; and these include the dissolution of the polymer in various solvents including naphthalene, thereafter precipitating and recovering the polymer. Typical of such processes is U.S. Pat. No. 2,762,788, the objects of which were to avoid polymer degradation and/or to separate from the useable polymer the degraded polymer and/or monomers and oligimers as impurities. These processes were slow and expensive; suitable only for laboratory usage.

It will thus be recognized that a satisfactory, rapid, and efficient process for recovery of polyester polymer from polyester polymer fibers or fabric would be a meritorious advance in the art. It would substantially reduce the raw material requirement for the world's largest fiber market.

SUMMARY OF THE INVENTION

In accordance with the present invention, a totally new process is provided for polymer recovery.

Briefly, the inventive concept is a process for recovering linear polyester polymer from polyester fibers or fabrics comprising:
1. dissolving polyester fibers in a non-depolymerizing dissolution solvent for polyester, characterized by inclusion of carbocyclic rings in the structural formula of the solvent base, to form a solution;
2. thereafter, precipitating out the polyester by quenching the solution; and,
3. separating the precipitated polyester from the dissolution solvent (and quenching medium, if applicable).

It is an advantage of this invention that preferred solvent systems are employed efficiently and rapidly in the recovery process.

It is another advantage of this invention that removal of solvent from recovered polymer is greatly simplified.

BRIEF DESCRIPTION OF THE DRAWING

The drawing schematically illustrates by means of a flow diagram a typical arrangement in accordance with the present invention.

DESCRIPTION OF THE PREFERRED EMBODIMENTS

We have discovered that polyester may be efficiently recovered by quenching from any solution of polyester and non-depolymerizing dissolution solvent for polyester which is characterized by inclusion of carbocyclic rings, preferably 1-3 carbocyclic rings, in the structural formula of the solvent base. Solvent selection, in accordance with this invention, must satisfy two requirements. The first requirement is that the polyester not be depolymerized substantially; and second, that the polyester must be rapidly and efficiently recovered from solution by quenching. Solvents having 1-3 cyclic nuclei are known to dissolve polyester, including polyethylene terephthalate; but it was not known that such solvents would give up polyester rapidly and in usable form when subjected to a quenching action. Examples of compounds having this characteristic are diphenyl, diphenyl ether, naphthalene, methylnaphthalene, benzophenone, diphenyl methane, acenaphthene, phenanthrene, para-dichlorobenzene, and the like. Substituted naphthalenes and biphenyls are specifically included in this group. Most solvents or mixtures thereof, of this type, dissolve polyethylene terephthalate, for example, at temperatures of from about 160° C to 240° C in an amount of about 10–40% of the polymer in solution. When these solutions are cooled gradually to about 100° C, a polycondensate precipitates as an amorphous gel or paste. On the other hand, however, when such polymer solutions are shock quenched, a solid white powder or flocculate is formed.

By "non-depolymerizing dissolution solvent for polyester" is meant any solvent which permits of dissolution and quick precipitation of high molecular weight polyester (over 10,000–20,000 number average molecular weight) without loss of more than about 15% of such molecular weight.

While there are other solvents which are non-depolymerizing for polyester, those which contain carbocyclic rings, preferably 1-3 carbocyclic rings, have been found particularly effective in quickly rendering a useful precipitate. Naphthalene has been found especially suitable for the practice of this invention because the solubility of polyester in naphthalene is a strong function of temperature, ranging from 0 solubility at 170° C to 55 percent polyester solubility at 218° C (boiling point of naphthalene).

The polyester, in the form of fabric or collection of fabrics, is contacted with sufficient solvent under dissolution conditions for the polyester fibers. Apparatus or equipment which may be used for fiber dissolution include tanks or vats, which may be agitated or not agitated, whether open top or covered or sealed to hold pressure or vacuum; bowl-type washing machines; centrifugal filters, with provisions for solvent rinsing and with or without provisions for continuous or intermittent removal of undissolved fabric contaminants; continuously or intermittently moving conveyor belts passing through solvent-contacting zones; screw conveyor devices; and solvent spraying devices. Of course, atmospheric conditions are preferred. Heat and agitation will normally be required.

When the polyester fibers have dissolved, the solution may be filtered if desired to remove any undissolved impurities.

Quenching by addition is accomplished by subjecting the solution to a quenching medium, preferably in the form of a liquid which is preferably a solvent for the primary dissolution solvent. For example, a naphthalene solution may be shock quenched with dimethyl formamide, this method having the advantage that should the quenching solvent lower the temperature of the naphthalene to a point where it would ordinarily solidify, the quenching solvent would keep the naphthalene in liquid phase. Other suitable quenching media which are solvents for naphthalene include acetone, dichloromethane, 1,1,1 trichloroethane, 1,4 dichlorobenzene, benzene, 2-butanone, dichloromethane, dimethylacetamide, ethanol, methanol, tetrachloromethane, toluene, trichloromethane, xylene, and molten 1,4-dichlorobenzene. of course, in the case of naptalene, polyester will precipitate from solution at a higher temperature than that at which naphthalene solidifies; and therefore quenching may be done with a non-solvent for naphthalene. Water, for example, has been successfully employed as a quenching material for the polyester solution. Of course, the dissolution solvent and quenching medium must not react with each other in an explosive or otherwise hazardous manner.

Quenching may be achieved while spinning a polymer solution through a quenching medium into filament with or without sequential or simultaneous drawing. If the quenching medium is a liquid, the solvent may be removed from the fiber during the fiber-forming process. If fibers are extruded into a gaseous quenching medium inert to the polyester as, for example, air, nitrogen, carbon dioxide, steam or mixtures thereof and which is at a temperature low enough to cause precipitation or coagulation of the polymer, the solvent contained in the polymer can thereafter be removed by extraction with a suitable solvent for the polymer but which is not, however, a solvent for the polyester. Suitable extraction solvents are inclusive of the liquid quenching media hereinbefore described. A solution spinning process wherein the polyester solution is spun into filaments and the filaments are passed through a liquid coagulating bath comprising the aforesaid liquid quenching media is particularly desirable. In such processes, the liquid quenching media may provide simultaneous precipitation of the polyester from solution, separation of primary solvent and any dyes from the polyester, and coagulation of the polyester solution streams into fibers.

Referring now to the drawing, the figure is a flow sheet embracing a preferred embodiment of this invention. Polyester waste fabric 1 may include dyestuff, finish, knitting oils, etc.; and there may be contamination in the form of other fibers, including cotton, rayon, wool, nylon, acrylics, and the like. Scraps of paper or wire may also be in the feedstock. The waste fabric is loaded into washer-dissolver 2, which is an agitation-spin-dry device, preferably having a wire-mesh covered rotatable bowl to prevent solid matter from being pumped out with liquids, this machine being similar to or identical with a conventional washing machine. Recycled naphthalene, at a temperature of about 165° C, is pumped from quench solvent flasher 11 into washer-dissolver 2. With agitation, more than half of the dye, knitting oil, finish, etc., is removed, and any moisture in the polyester is evaporated. The waste fabric load is spun out, and the spent naphthalene is recycled through flasher 3 to provide dye-free naphthalene for reuse in the dissolution step. Residual dyestuff, permanent press resins, etc., are discarded. The relatively dye-free naphthalene is recycled at about 190°–210° C into washer-dissolver 2 causing immediate dissolution of the polyester. The solution of polyester in hot naphthalene is pumped out of washer-dissolver 2 through in-line filter 4 thereafter to be mixed in two-fluid nozzle 5 with the quenching medium which is dimethyl formamide (DMF) and dropped as a precipitate into slurry tank 6. Alternately, the two-fluid nozzle 5 may be bypassed and the quenching medium pumped directly into slurry tank 6 while the hot solution of polyester in naphthalene is sprayed into slurry tank 6.

Washer-dissolver 2, at this point contains only solid material which was not carried off in solution. This may include any paper, metal scraps, cotton, rayon, wool, nylon or acrylic fibers which were present in the waste fabric. This material is removed before a new load is placed in washer-dissolver 2.

The low temperature DMF injection at two-fluid nozzle 5 has caused a shock-quenching effect and thereby precipitated finely divided polyester powder which forms a suspension in the solution of DMF and naphthalene. Some residual dyestuff is also dissolved in the solution.

The polyester slurry is then fed to batch centrifugal filter 7 in which, during the first centrifuge cycle, a polyester filter cake is formed. The slurry feed is then interrupted and the filter cake sprayed with dichloromethane to rinse off the DMF, napthalene and any residual dye. The white filter cake is then discharged to drying bin 8 where it is dried under mild heat conditions (above 40° C) to produce a crumb-like polyester material. Intrinsic viscosity of the polyester crumb product is equal to the intrinsic viscosity of normal polyester spinning feedstock. No water or air is present in the drying bin, the vaporization of the dichloromethane generating its own continuous inert gas purge. Under such conditions, the material may then be fed directly from drying bin 8 to a bypass-vented extruder (not shown) and thereafter spun into filament.

In addition to the dye purge flasher 3, recovery systems for the naphthalene, the quench solvent, and the rinse solvent are integral with, although not essential to, this invention. Included in the material fed to centrifuge 7 is the naphthalene polyester dissolution solvent, the DMF quenching medium, and the dichloromethane rinse solvent. This combination of solvents is fed from centrifuge 7 to rinse solvent flasher 9 wherein dichloromethane is vaporized at about 40° C and fed to rinse solvent tank 10 for reuse. The DMF/naphthalene/residual dye solution is fed from rinse solvent flasher 9 to quench solvent flasher 11 where DMF is vaporized at about 153° C for use in quenching the polyester/naphthalene solution. The residue from quench solvent flasher 11 is fed to washer-dissolver 2 for use in the preliminary dye removal step. Washer-dissolver 2 and rinse solvent tank 10 are equipped with condensers 12 and 13 respectively, thereby to recover overhead losses.

A polyester is defined as a synthetic linear condensation-type polymer whose repeating units contain the ester group,

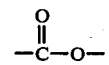

these groups being integral members of the linear polymer chain. Polyesters known to be useful in the practice of this invention are those derived from aromatic dicarboxylic acids such as terephthalic acid and isophthalic acid and glycols such as ethylene glycol, cyclohexane dimethanol and 1,4 butanediol. Polyethylene terephthalate is preferred in the practice of this invention. Polyesters as used herein include copolymers containing repeating units of two or more different kinds such as copolyester-amide provided that at least two-thirds of the repeating units are the above-defined ester linkages

Representative examples include poly(ethylene terephthalate), poly(trimethylene terephthalate), poly(tetramethylene terephthalate), poly(ethyleneisophthalate), poly(octamethylene terephthalate) poly(decamethylene terephthalate), poly(pentamethylene isophthalate), poly(tetramethylene isophthalate), poly(hexamethylene isophthalate), poly(hexamethylene adipate), poly(pentamethylene adipate), poly(pentamethylene sebacate), poly(hexamethylene sebacate), poly(1,4-cyclohexylene adipate), poly(1,4-cyclohexylene sebacate), poly(ethylene terephthalate-co-sebacate), and poly(ethyleneco-tetramethylene terephthalate).

Unless otherwise indicated, the term "polyester fiber", as used herein to describe the starting material which is subjected to dissolution and recovery in accordance with this invention, includes fiber, filaments, monofilaments, bands, ribbons, tubes, films and other linear constructions and other extruded or molded linear polyester polymer materials such as spinning machine lump waste, polyester flake, molded articles such as bottles, gears, or other solid objects (which may be processed directly or can be ground to pellet or powder form before being processed); and includes yarns, threads, fabrics and other products into which these constructions may be incorporated as well as common impurities associated with such products, new or old.

EXAMPLE 1

To show the effect of naphthalene-type solvents on molecular weight, a sample of fabric composed of polyethylene terephthalate fibers was dissolved at 10% polymer concentration in naphthalene at 210° C. The solution was placed under vacuum at 110° C for 2 hours, and a fine white powder of polyethylene terephthalate was obtained. Residual naphthalene was rinsed off with 1,1,1-trichloroethane. The intrinsic viscosity of the recovered powder was compared with the intrinsic viscosity of the original sample, and the results are shown in the following table:

TABLE I

| Intrinsic Viscosity of Original Sample | Intrinsic Viscosity of Recovered Powder |
|---|---|
| 0.6031 | 0.6045 |
| 0.6145 | 0.6074 |

EXAMPLE 2

A brown commercially available double knit polyester (polyethylene terephthalate) sample was dissolved at a 10% polymer concentration in naphthalene, and the solution was poured (hot) into an excess of dimethyl formamide at 140° C, producing a dilute slurry of white polyester in a colored solution. The slurry was allowed to cool and was thereafter filtered. The solids were rinsed twice with dimethyl formamide, and then with water. After drying, the granular solids were an off-white color. The heat of the dimethyl formamide in this example apparently detracted from the quenching effect.

EXAMPLE 3

The same hot polyester naphthalene solution was poured into an excess of dimethyl formamide at room temperature, then filtered and rinsed with dimethyl formamide and water. After drying the powdery solid was white.

EXAMPLE 4

A 20% solution of linear polyester in phenanthrene at 210° C was quenched in acetone, producing a white flocculent product melting at 250° C with an intrinsic viscosity of 0.5153.

EXAMPLE 5

A 20% solution of linear polyester in acenaphthene was quenched in acetone, producing a cream-colored flocculent product melting at 254° C, with an intrinsic viscosity of 0.5418. The cream color probably was attributable to the brown color of the acenaphthene before heating to melt.

EXAMPLE 6

To illustrate the significance of a quench as opposed to slow precipitation from a product quality point of view, commercially purchased dyed polyester rags were dissolved at 17.25% polymer concentration in naphthalene. Half of this solution was poured at 200° C directly into acetone. The other half was cooled slowly to room temperature. The slowly cooled material yielded a pale blue powder having an intrinsic viscosity of 0.52–0.54. The quenched product was a flocculent white product having an intrinsic viscosity of 0.52–0.53. Apparently slow cooling traps dyestuff within the polyester powder particles.

As previously stated polyethylene terephthalate is the preferred polymer. However, copolymers are workable as are other linear and quasi-linear polymers such as exemplified below.

EXAMPLE 7

A brown commercially available double knit poly(cyclohexane dimethanol terephthalate) sample was dissolved at a 10% polymer concentration in naphthalene, and the solution was poured hot into an excess of dimethyl formamide at room temperature, then filtered and rinsed with dimethyl formamide and water. After drying, the powdery solid was white.

EXAMPLE 8

A 10% sample of poly(butylene terephthalate) in naphthalene at 210° C was poured directly into acetone at room temperature. Polyester was recovered as a powder, having a melting point of 225° C, and an intrinsic viscosity of 1.0660.

The embodiments of the invention in which an exclusive property or privilege is claimed are defined as follows:

1. A process for recovering solid linear polyester polymer from polyester fibers which comprises the steps of:
   a. dissolving the polyester fibers in a non-depolymerizing dissolution solvent for polyester under conditions permitting dissolution of high molecular weight polyester without loss of more than 15% of such molecular weight, to form a solution;
   b. quenching the solution under such conditions that the polyester polymer is caused to precipitate out in a form having a molecular weight of within 15% of the molecular weight of the fibers leaving the solvent in liquid phase; and, c. separating the precipitated polyester polymer from the non-depolymerizing solvent.

2. The process of claim 1 wherein the non-depolymerizing solvent is characterized by at least one aromatic ring in its structural formula.

3. The process of claim 1 wherein the solvent is selected from the group consisting of diphenyl, diphenyl ether, naphthalene, methylnaphthalene, benzophenone, diphenyl methane, acenaphthene, phenanthrene, paradichlorobenzene, substituted naphthalene and substituted diphenyl.

4. The process of claim 1 wherein the quenching medium is a gas.

5. The process of claim 1 wherein the quenching medium is a liquid.

6. The process of claim 1 wherein the solvent is naphthalene.

7. A process for recovering solid linear polyester polymer from polyester fibers which comprises the steps of:
   a. dissolving the polyester fibers in a non-depolymerizing dissolution solvent for polyester under conditions permitting dissolution of high molecular weight polyester without loss of more than 15% of such molecular weight, to form a solution;
   b. quenching the solution with a liquid quenching medium under such conditions that the polyester is caused to precipitate out in a form having a molecular weight of within 15% of the molecular weight of the fibers leaving the solvent and the quenching medium in liquid phase;
   c. and separating the precipitated polyester polymer from the solvent and the quenching medium.

8. The process of claim 7 wherein the solvent for polyester is characterized by at least one aromatic ring in its structural formula.

9. The process of claim 7 wherein the solvent for the polyester is characterized by 2-3 aromatic rings in its structural formula.

10. The process of claim 7 wherein the solvent for polyester is selected frrom the group consisting of diphenyl, diphenyl ether, naphthalene, methylnaphthalene, benzophenone, diphenyl methane, acenaphthalene, phenanthrene, paradichlorobenzene, substituted naphthalene and substituted diphenyl.

11. The process of claim 7 wherein the solvent for polyester is naphthalene.

12. The process of claim 7 wherein the quenching medium is a solvent for the non-depolymerizing solvent for polyester.

13. The process of claim 7 wherein the quenching medium is a non-solvent for the non-depolymerizing solvent for polyester.

14. The process of claim 7 wherein the quenching medium is selected from the group consisting of water, dichloromethane, dimethyl formamide, 1,1,1 trichloroethane, naphthalene, acetone, benzene, 2-butanone, dichloromethane, dimethylacetamide, ethanol, methanol, tetrachloromethane, toluene, 1,1,1-trichloroethane, trichloromethane, xylene, and molten 1,4-dichlorobenzene.

15. The process of claim 7 wherein the quenching medium is dimethyl formamide.

16. The process of claim 7 wherein the quenching medium is water.

17. The process of claim 7 wherein the quenching medium is acetone.

18. The process of claim 7 wherein the non-depolymerizing solvent for polyester and the quenching medium is the same.

19. The process of claim 7 wherein the polyester is polyethylene terephthalate.

20. The process of claim 7 wherein the solution contains 10-40% of polyester polymer.

21. The process of claim 7 wherein the polyester is poly(cyclohexanedimethanol terephthalate).

22. The process of claim 7 wherein the polyester is poly(butylene terephthalate).

* * * * *